US005383085A

United States Patent [19]

Boy et al.

[11] Patent Number: 5,383,085

[45] Date of Patent: Jan. 17, 1995

[54] ASSEMBLY FOR THE DISCHARGE OF ELECTRIC OVERVOLTAGES

[75] Inventors: Jürgen Boy; Axel Hahndorff, both of Berlin, Germany

[73] Assignee: Siemens Aktiengesellschaft, Munich, Germany

[21] Appl. No.: 128,421

[22] Filed: Sep. 28, 1993

[30] Foreign Application Priority Data

| | | | |
|---|---|---|---|
| Sep. 28, 1992 | [DE] | Germany | 4232917 |
| Apr. 21, 1993 | [DE] | Germany | 4313655 |
| May 28, 1993 | [DE] | Germany | 4318363 |
| Sep. 10, 1993 | [DE] | Germany | 4331215 |

[51] Int. Cl.⁶ .............................. H02H 9/06

[52] U.S. Cl. .............................. 361/119; 361/120; 361/127; 337/28; 313/231.11

[58] Field of Search .............. 361/119, 120, 126, 127, 361/56; 337/28, 29; 313/325, 608, 631, 231.11

[56] References Cited

U.S. PATENT DOCUMENTS

| | | | |
|---|---|---|---|
| 4,132,915 | 1/1979 | Wilms | 313/325 |
| 4,237,515 | 12/1980 | Pierce, Jr. | 361/127 |
| 4,237,516 | 12/1980 | Pierce, Jr. | 361/127 |
| 4,587,589 | 5/1986 | Marek | 361/56 |
| 4,707,762 | 11/1987 | Yapoujian | 361/124 |
| 4,736,269 | 4/1988 | Amein et al. | 361/128 |
| 4,908,730 | 3/1990 | Westrom | 361/120 |
| 4,912,592 | 3/1990 | Flindall et al. | 361/120 |
| 4,984,125 | 1/1991 | Uwano | 361/124 |
| 5,012,383 | 4/1991 | Seike et al. | 361/120 |
| 5,142,434 | 8/1992 | Boy et al. | 361/120 |

FOREIGN PATENT DOCUMENTS 2355421 8/1977 Germany .

*Primary Examiner*—Todd DeBoer

*Attorney, Agent, or Firm*—Kenyon & Kenyon

[57] ABSTRACT

As a known "back-up device" for a gas-filled over-voltage arrester, a voltage-dependent resistor (6) is arranged centrally in a housing with the over-voltage arrester (1). The varistor (6) can, in this connection, be sealed with a moisture-repelling substance and it is arranged concentrically to a connecting pin (5) of the over-voltage arrester. By means of an auxiliary electrode (8) of annular disk shape placed on the varistor (6), an air gap (13) from the connecting pin (5) can be formed. The varistor, after its response, can be short-circuited via this air gap.

12 Claims, 2 Drawing Sheets

ASSEMBLY FOR THE DISCHARGE OF ELECTRIC OVERVOLTAGES

BACKGROUND OF THE INVENTION

The present invention falls within the field of electric components and is intended for use in the construction of a gas-filled over-voltage arrester which is combined, in a metal housing, with a parallel-connected voltage-limiting device, so as to form a special assembly. Such assemblies are used, in particular, wherever it is necessary to provide additional assurance against the possible failure of a gas filled over-voltage arrester.

In one known assembly of this type, the parallel-connected voltage-limiting device is developed as an air discharge gap. For example, for this purpose a thin insulating foil provided with holes is placed on one electrode of the over-voltage arrester which has a cylindrical connecting pin, the foil, in its turn, bearing an auxiliary electrode in the form of an annular disk. The air discharge gap thus formed and the over-voltage arrester are combined by means of a cylindrical metal housing to form an assembly. The housing electrically connects the auxiliary electrode to the corresponding electrode of the over-voltage arrester (U.S. Pat. No. 4,736,269). In this case, the axial clamping of the air discharge gap and the over-voltage arrester is effected by a flanged edge of the housing, which at various places on its circumference is pressed down onto the auxiliary electrode. In this known embodiment, the centering of the over-voltage arrester in the metal housing is effected by a tubular ceramic insulator of the over-voltage arrester, the outside diameter of which is greater than the outside diameter of the two electrodes of the over-voltage arrestor.

In another, similar embodiment of such an assembly, the electrodes and the insulator of the over-voltage arrester can have the same outside diameter. In that case, the centering of the over-voltage arrester in the housing, the inside diameter of which is greater than the outside diameter of the over-voltage arrester, is effected by indentations distributed uniformly on the periphery of the metal envelope of the container, the indentations being present in the region of the ceramic insulator (U.S. Pat. No. 5,142,434).

With these known assemblies, there is the danger that due to moisture the breakdown voltage of the parallel connected air discharge gap will be reduced to below the breakdown voltage of the over-voltage arrester and that thereupon the entire element will fail by a single response of the air discharge gap.

It has therefore already been proposed to encapsulate this parallel-connected air discharge gap. An arrangement for this is known in which the air discharge gap consists of a flat, stepped ceramic cylinder bearing metal layers applied to it by vapor deposition. This discharge gap is placed on the one electrode of the over-voltage arrester and soldered to it. Furthermore, a metal cap is placed over the end of the over-voltage arrester provided with the applied discharge gap, the cap being soldered on one side to a metal coating of the discharge gap and sealed on the other side with respect to the cylindrical insulator of the over-voltage arrester by means of a silver-containing epoxide resin (U.S. Pat. No. 4,707,762). Such an encapsulation of the air discharge gap is relatively expensive to produce.

SUMMARY OF THE INVENTION

A gas filled over-voltage arrester may have a tubular ceramic insulator with two electrodes arranged at the ends of the insulator, the second of the electrodes having an axially extending cylindrical connecting pin. The present invention provides an assembly consisting of over-voltage arrester, voltage limiting device, and metal housing so that the voltage limiting device is protected against the influence of moisture and the construction of the entire element is simple from a manufacturing standpoint.

It is proposed, in accordance with the present invention, that the voltage limiting device consist of a metal-oxide varistor in the form of a hollow cylinder, having end sides that are metallized; that the ceramic insulator and the electrodes of the over-voltage arrester as well as the hollow-cylindrical varistor have the same or approximately the same outside diameter; and that the inside diameter of the metal envelope of the housing be greater than the outside diameter of the over-voltage arrester and of the varistor, at least one spacer being provided for the centering of the over-voltage arrester and the varistor.

The parallel electric connection of an over-voltage arrester and a voltage limiting device of the form of a metal-oxide varistor, is, in itself, known (German AS 23 55 421, claim 1, as well as column 2, lines 46 to 65). In this known parallel circuit, the unavoidable delay in breakdown of the gas-filled over-voltage arrester is eliminated by the use of a varistor having a response time that is only slightly above that of the over-voltage arrester where the response voltage of the varistor is, in general, the voltage at which the varistor conducts a current of 1 mA. Zinc oxide in particular is used as varistor material (U.S. Pat. No. 3,905,006).

In an assembly developed in accordance with the present invention, a negative influence of moisture on the response voltage of the voltage limiting device is substantially excluded by the use of a varistor. If the assembly is particularly endangered by moisture during operation, the varistor can be additionally sealed by a moisture-repelling substance in the nonmetallized region of its surface. A hardenable silicone oil or a silicone resin could be used as the moisture repelling substance, the sealing being effected by impregnation or immersion followed by heat treatment. However, the varistor can also, possibly in addition, be provided with an insulating coating on its inner and outer surfaces in the form, for instance, of a glaze. It is also possible to seal the entire assembly at the open end of the metal housing, for instance by means of a cast-resin sealing compound.

Since no special shaping with closely defined dimensions is necessary for the manufacture of the varistor and no special measures of adjustment are required for the arranging thereof, the individual parts of the assembly can be easily handled and are thus accessible to automated production.

The centering of the arrester and the varistor in the metal can be effected, for instance, by several spacers, in the form of indentations, provided on the metal housing and distributed uniformly on its circumference, in the region of the outer surface of the ceramic insulator as well as in the region of the outer surface of the varistor. For example, three indentations each can be provided, and can be developed either as points or in the form of axially extending jags. In such a case, it is necessary to provide the outer surface of the varistor with an insulating coating, for instance a layer of glass or glaze.

Another technique for centering employs a tubular insulating part as a spacer, the part being arranged between the metal housing on the one hand and the over-voltage arrester and varistor on the other hand. Such an insulating part may consist of a tapelike winding and, in particular, of a shrinkdown plastic tubing which surrounds the over-voltage arrester and the varistor. Such an insulating part furthermore provides assurance that no electric discharge can take place between the second electrode of the over-voltage arrester and the metal housing.

From a manufacturing standpoint there is particularly suitable a centering in which the metal housing is provided with indentations only for the centering of the over-voltage arrester and in which an annular spacer of insulating material, for instance a rubber ring or a piece of tubing, is provided for centering the varistor.

Alternatively, to center the varistor, a spacer may be used which consists of a cuplike auxiliary electrode which rests on the second electrode and the wall of the auxiliary electrode consists of several fingerlike tabs, the free ends of these fingerlike tabs resting resiliently against the inner wall of the metal housing with the interpositioning of an insulating layer consisting of a fusible plastic. Such a spacer also assures so-called fail-safe behavior of the assembly (see U.S. Pat. No. 4,912,592, part 8, and U.S. Pat. No. 4,984,125, part 14). In this connection, the insulating layer can be applied to the ends of the fingerlike tabs or to the inner wall of the metal can, or an insulating foil can be arranged between the metal can and the cap.

The arrangement with respect to each other of over-voltage arrester and varistor on the one hand and metal housing on the other hand can be facilitated, particular from a manufacturing standpoint, if an auxiliary electrode in the form of an annular disk, the outside diameter of which corresponds to the inside diameter of the metal envelope of the housing, is placed on the second electrode of the varistor. In this case, upon the manufacture of the component, the edge at the open end of the metal housing is pressed against the auxiliary electrodes at various places distributed along the periphery, with the auxiliary electrode forming a good abutment. In this connection, the auxiliary electrode itself can be developed as a cup spring, or be additionally provided with a cup spring, to assure dependable axial clamping of the parts.

The use of an auxiliary electrode in the shape of an annular disk can furthermore serve to create an additional discharge path in the region of the component. This is present when the inside diameter of the auxiliary electrode of annular-disk shape is 0.2 to 2 mm larger than the outside diameter of the cylindrical connection pin of the second electrode of the over-voltage arrester. By this dimensioning, a discharge gap by which the varistor can be short circuited is formed between the auxiliary electrode and the cylindrical connection pin. It enters into action when the over-voltage arrester has failed and the varistor has responded and if, due to the current load and the heating of the varistor resulting therefrom, the annular gap between the auxiliary electrode and the connecting pin is ionized by gases emerging from the varistor. The arc then produced leads either to a short circuit between auxiliary electrode and metal pin or to the melting of a solder pellet arranged below or above the component, such as known, for instance, from Fig. 1 of U.S. Pat. No. 4,502,087.

The dimensioning of the varistor, i.e., the determination of height and wall thickness, as well as the selection of the material (in particular having a base of zinc oxide), can be such that the response voltage of the varistor lies in a defined manner, for example, at least 40% above the response voltage of the over-voltage arrester. With a response voltage of the over-voltage arrester of about 350 volts, the varistor can therefore be so dimensioned that it conducts, with an applied voltage of 100 volts a current of $\leq 0.5\ \mu A$,
200 volts a current of $\leq 5\ \mu A$,
650 volts a current of about 1 MA,
750 volts a current of about 1 A and
1000 volts a current of about 30 A.

BRIEF DESCRIPTION OF THE DRAWINGS

Four embodiments of the new assembly are shown in cross-sectional view in FIGS. 1 to 4.

DETAILED DESCRIPTION

Figure 1:
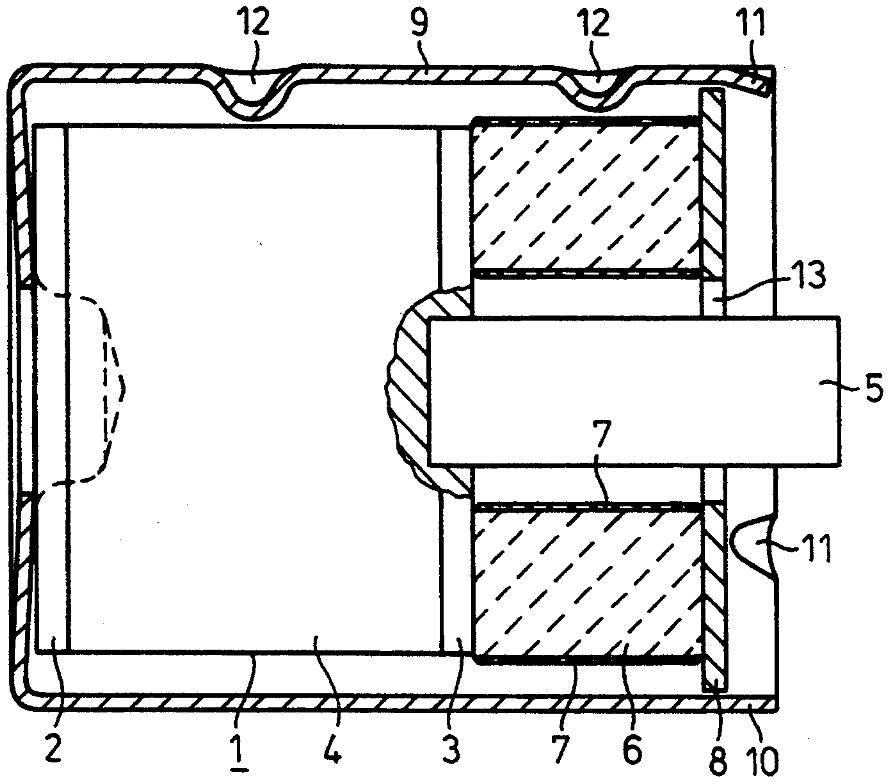
FIG. 1 shows an embodiment with centering of an arrester and a varistor by means of indentations in a metal container or housing.

The assembly of FIG. 1 consists of an over-voltage arrester 1, a voltage-dependent resistor 6, and a metal container or housing 9 with an auxiliary electrode 8. The over-voltage arrester 1 has in this connection a first electrode 2, a ceramic insulator 4, and a second electrode 3. The second electrode 3 has a cylindrical axially arranged connection pin 5.

The voltage-dependent resistor 6 in the form of a zinc-oxide varistor has a hollow cylindrical shape, the two end surfaces being metallized—in a manner not shown in detail—and both the inner and the outer surfaces are provided with a glaze 7. This glaze has a layer thickness of about 0.1 to 0.25 mm. The height of the hollow cylinder is, for instance, 3.1 mm with an outside diameter of about 7.3 mm and a wall thickness of about 2.1 mm. Furthermore, the varistor is sealed with a moisture repelling substance.

The varistor 6 is placed on the second electrode 2 of the over-voltage arrester and arranged concentric to the connecting pin 5. Again, an auxiliary electrode 8 in the shape of an annular disk is placed on the varistor, the inside diameter of its ring being somewhat smaller than the inside diameter of the varistor 6 and its outside diameter being greater than the outside diameter of the varistor 6. Varistor 6 and over-voltage arrester 1 have approximately the same diameter.

Over-voltage arrester 1, varistor 6, and auxiliary electrode 8 are arranged within a cylindrical metal housing 9. The over-voltage arrester 1 lies on the bottom of the housing. A plurality of indentations 11 are distributed on the periphery on the edge 10 of the housing 9 for fixing the over-voltage arrester, the varistor and the auxiliary electrode in place within the metal housing. Furthermore, uniformly distributed indentations 12 on the periphery of the metal container serve to center the over-voltage arrester and the varistor within the housing and are provided both in the region of the ceramic insulator 4 and in the region of the varistor 6.

The inside diameter of the auxiliary electrode 8 which has the shape of an annular disk is furthermore so dimensioned that an air gap 13 is formed between the auxiliary electrode and the connecting pin 5, the width of the air gap being between 0.1 and 1 mm.

Figure 2:
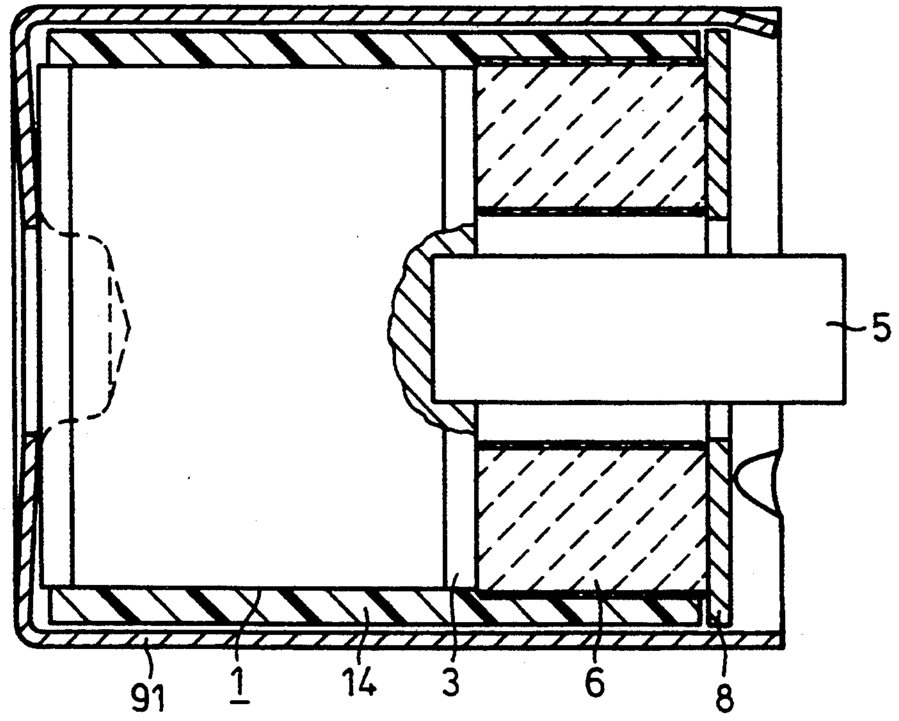
FIG. 2 shows an embodiment with centering by means of a tubular insulating part.

In the embodiment shown in FIG. 2, a tubular insulating part in the form of shrinkdown tubing 14 is provided for centering of the over-voltage arrester 1 and the varistor 6 within the metal housing 91. The tubing surrounds the over-voltage arrester and the varistor. The shrinkdown tubing eliminates the need for centering indentations in the metal housing 91 such as provided in the embodiment of FIG. 1. Furthermore, the shrinkdown tubing 14 prevents possible short-circuiting between the electrode 3 and the metal container 91 in the event of the failure of the over-voltage arrester.

Figure 3:
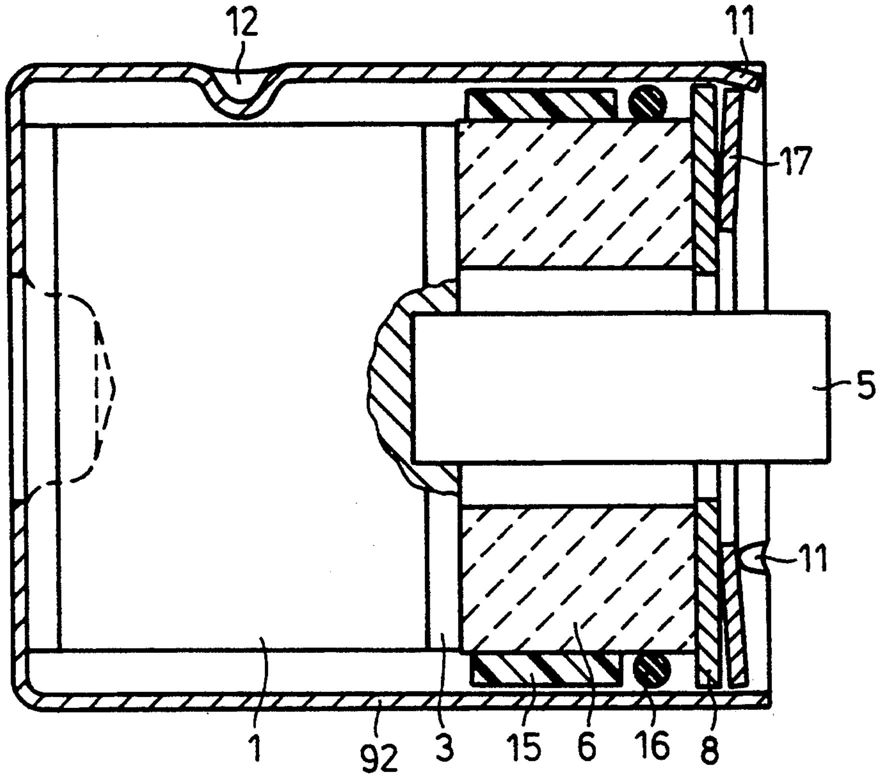
FIG. 3 furthermore shows an embodiment in which a cup spring is furthermore placed on an auxiliary electrode and in which over-voltage arrester and varistor are centered in a different manner.

In another embodiment illustrated in FIG. 3, the embodiment of FIG. 1 is modified to include a cup spring 17 which is placed on the auxiliary electrode 8. The indentations 11 in the metal housing 92 thus surround the cup spring 17 by means of which the arrester 1, the varistor 6, and the auxiliary electrode 8 are clamped axially to each other. Furthermore, only the over-voltage arrester 1 is centered by means of indentations 12. A piece of tubing 15, the outside diameter of which in attached condition is somewhat smaller than the inside diameter of the metal housing 92, is placed on the varistor 6 to center it. A rubber ring 16 can also be used instead of the piece of tubing 15.

Figure 4:
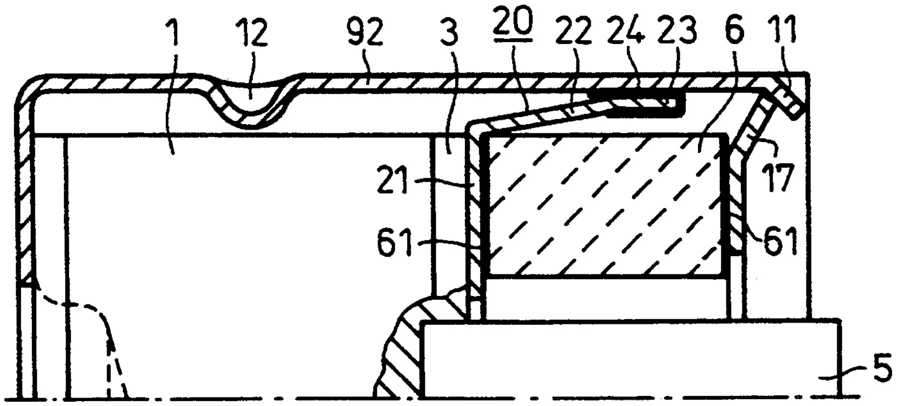
FIG. 4 shows an embodiment in which a cuplike auxiliary electrode is provided to center the varistor.

In another embodiment shown in FIG. 4, the over-voltage arrester 1 is centered in the metal housing 92 by means of several indentations 12, as in the embodiment shown in FIG. 3. The end sides of the varistor 6 are provided with a metallization 61 and the rest of the surface is sealed in moisture-tight manner by a silicone wax. A cup-shaped electrode 20 is provided to center the varistor. The bottom 21 of varistor 6 is seated on the electrode 3. The wall of the varistor 6 consists of finger-like tabs 22, similar to those tabs disclosed in U.S. Pat. No. 4,132,915, Fig. 4, part 32. The ends 23 of the finger-like tabs lie resiliently against the inner wall of the metal housing 92, the ends 23 being individually surrounded by an insulating layer 24 consisting of a fusible plastic.

What is claimed is:

1. An assembly for the discharge of electric voltages comprising:

a housing, including a spacer along an inside diameter;

an over-voltage arrester including a tubular ceramic insulator and first and second electrodes arranged at opposite ends of said tubular ceramic insulator, said second electrode having an axially extending cylindrical connecting pin; and a voltage-limiting device being electrically connected in parallel with said over-voltage arrester and having a response voltage greater than a response voltage of said over-voltage arrester, said voltage-limiting device being placed on said second electrode of said over-voltage arrester and comprising a metal oxide varistor in the form of a hollow cylinder having metallized end sides;

wherein said over-voltage arrester and said voltage emitting device are arranged concentrically in the housing with said spacer centering said over-voltage arrester, and wherein said ceramic insulator, said first and second electrodes and said hollow-cylindrical varistor having approximately the same outside diameter which is less than said inside diameter of said container.

2. The assembly of claim 1, wherein a surface of the hollow-cylindrical metal-oxide varistor is sealed with a moisture-repelling substance.

3. The assembly of claim 1, wherein an outer surface of the varistor is provided with an insulating coating and wherein several spacers in the form of indentations are provided uniformly distributed on a periphery of said housing both in the region of an outer surface of the ceramic insulator and in the region of the outer surface of the varistor.

4. The assembly of claim 1, wherein said housing is provided with several indentations for the centering of the over-voltage arrester, and further comprising an annular spacer of insulating material applied on the varistor to the center said varistor of it.

5. The assembly of claim 1, wherein said spacer for the over-voltage arrester including several indentations in the housing, and further comprising a spacer for centering the varistor which comprises a cuplike auxiliary electrode that lies on the second electrode and has a wall that includes a plurality of fingerlike tabs with free ends of the fingerlike tabs resting resiliently against an inner wall of the housing with an insulating layer of a fusible plastic interposed therebetween.

6. The assembly of claim 1, wherein said spacer comprises a tubular insulating part which is arranged between the housing and the over-voltage arrester and said varistor.

7. The assembly of claim 6, further comprising a shrinkdown tube surrounding the over-voltage arrester and the varistor.

8. The assembly of claim 1, further comprising an auxiliary electrode in the shape of an annular disk having an outside diameter that corresponds to the inside diameter of the housing can said disk being placed on the second electrode of the varistor.

9. The assembly of claim 8, wherein an inside diameter of said auxiliary electrode of annular disk shape is 0.2 to 2 mm greater than an outside diameter of the cylindrical connecting pin of the second electrode of the over-voltage arrester.

10. The assembly of to claim 8, wherein said auxiliary electrode comprising a cup spring.

11. The assembly of claim 8, further comprising a cup spring having an outside diameter that corresponds to the inside diameter of the housing, said spring being placed on the auxiliary electrode.

12. The assembly of claim 1, wherein with a response voltage of the over-voltage arrester of about 350 volts, the material, the height, and wall thickness of the varistor are selected so that the varistor conducts, with an applied voltage of 100 volts, a current of $\leqq 0.5$ μA,
200 volts, a current of $\leqq 5$ μA,
650 volts, a current of about 1 mA,
750 volts, a current of about 1 A, and
1000 volts, a current of about 30 A.

* * * * *